Patented Apr. 21, 1931

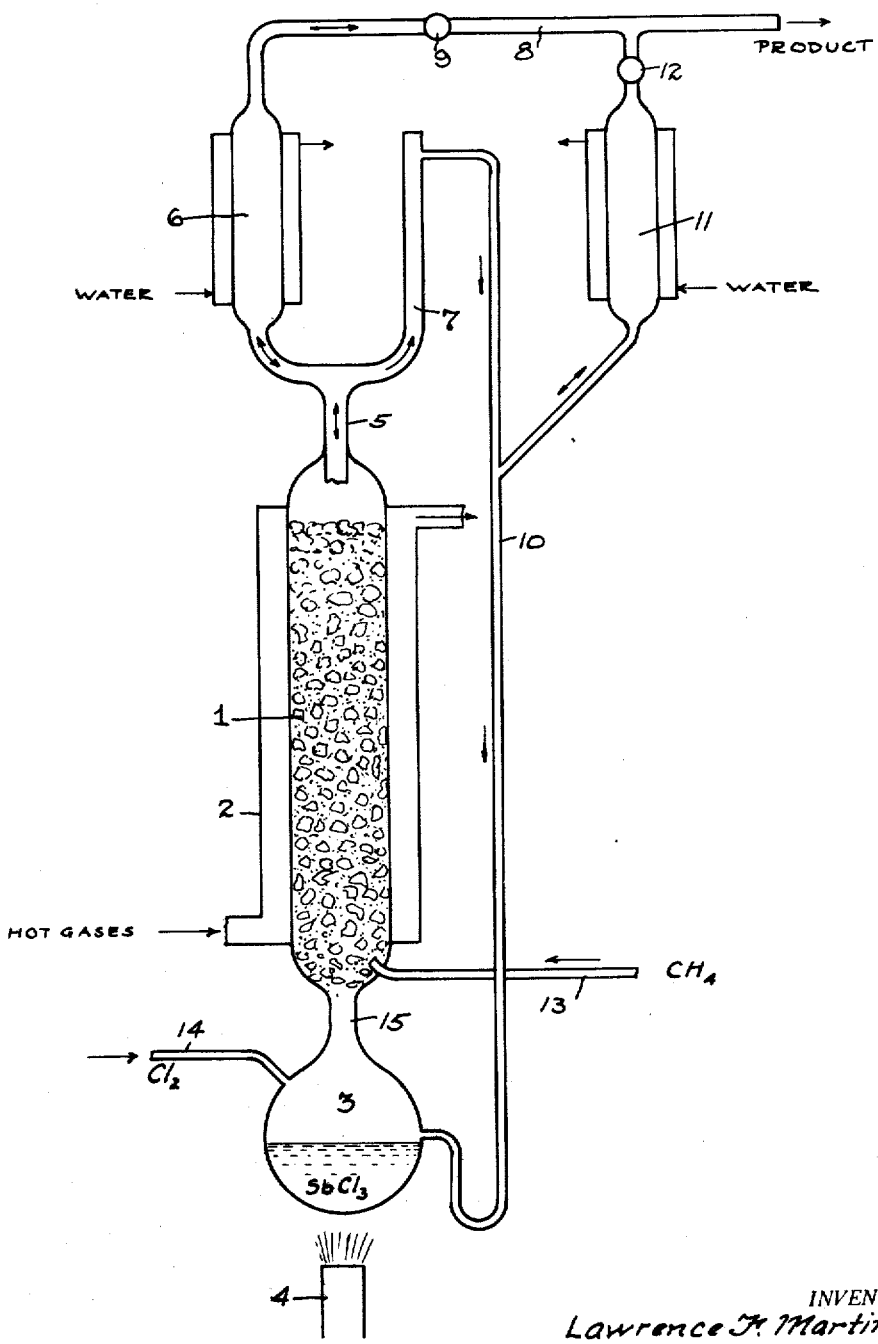

1,801,873

UNITED STATES PATENT OFFICE

LAWRENCE F. MARTIN AND ALBERT R. LUX, OF MIDLAND, MICHIGAN, ASSIGNORS TO THE DOW CHEMICAL COMPANY, OF MIDLAND, MICHIGAN, A CORPORATION OF MICHIGAN

CHLORINATION OF ALIPHATIC HYDROCARBONS

Application filed August 31, 1928. Serial No. 303,312.

The present invention, relating as indicated to the chlorination of aliphatic hydrocarbons, has regard particularly to the lower gaseous members of such series or mixtures thereof and still more particularly to methane and gaseous mixtures including natural gas which largely consist of methane, together with a smaller amount of ethane. The direct chlorination of such gaseous hydrocarbons takes place only at more or less elevated temperatures, in the case of methane at about 400° C. The reaction once started, however, often proceeds with explosive violence, leading to the formation of considerable amounts of decomposition products, and in any case is difficult to control so that the product is a varying mixture of chlorinated derivatives in amount far short of the theoretical yield. In an effort to overcome the foregoing drawbacks the reaction has been carried out, as is well known, in the presence of inorganic halides, which are employed either as catalysts or for other purposes, such as in a fused condition to serve as a fluid medium for the chlorination. The effect of catalysts in general however, has not altogether overcome these disadvantages, and in fact their use at times leads to a more extensive chlorination than is desired. It has also been proposed to employ a large excess of one or the other of the reacting gases, or to dilute the gaseous reacting mixture by introducing a large volume of an inert gas and in this way to moderate the reaction, but such procedure has the disadvantages of greatly reducing the capacity of the chlorinating apparatus and rendering the separation and recovery of the reaction products more difficult.

We have discovered that the chlorination of such aliphatic hydrocarbons may be more effectively carried out in an atmosphere of the vapors of a volatile chloride of an inorganic element capable of forming both a higher and a lower chloride, whereby the reaction is caused to proceed smoothly without danger of explosion and the formation of decomposition products. Another object of our invention is to provide for a closer control of the yield of the several chlorinated compounds possible of production from the hydrocarbon employed, whereby one or another of such compounds may be obtained in predominating amount as desired. To the accomplishment of the foregoing and related ends the invention, then, consists in the steps hereinafter fully described and particularly pointed out in the claims, the annexed drawing and the following description setting forth but one of the various ways in which the principle of the invention may be used.

In said annexed drawing:

The single figure there appearing illustrates diagrammatically an apparatus suitable for carrying out our improved process.

As examples of inorganic chlorides that may be employed in the operation of our improved process iodine monochloride or antimony trichloride may be mentioned. In either case a higher chloride also exists, e. g., iodine trichloride or antimony pentachloride, which under certain conditions can enter into a state of equilibrium with the corresponding lower chloride, viz:

At ordinary temperatures, in the presence of free or molecular chlorine, the lower chloride tends strongly to be transformed into the higher chloride. With increase of temperature, however, the reverse process becomes more and more effective, until a temperature is reached above which the higher chloride is almost entirely dissociated. In the case of the antimony chlorides, dissociation of the pentachloride commences at about 140° C., and is practically complete at a temperature slightly above 200° C.

The significance of the above relation between the higher and lower chlorides mentioned, for the purposes of the present invention, is believed to lie, at least in part, in the simultaneous occurrence of the processes of association and dissociation which results in a continuous transformation of molecular chlorine into nascent or activated chlorine. Taking for illustration the case of the antimony chlorides, the operation of the combined processes may be expressed as follows:

In other words, at temperatures above that at which antimony pentachloride is readily dissociated, i. e., above 140° C., the admixture of ordinary molecular chlorine with antimony trichloride leads momentarily to the formation of the pentachloride, which at once is dissociated, however, into antimony trichloride and nascent, as distinguished from molecular, chlorine, the latter being in a more highly reactive state than ordinary molecular chlorine. In the present connection it has been found that, whereas molecular chlorine alone does not attack methane below a temperature of about 350° C., in the presence of antimony trichloride in about equimolecular amount it acts readily at a temperature as low as 230° C.

In our improved process for chlorinating aliphatic hydrocarbons, in particular methane, we make use of activated chlorine obtained, as just stated, by the dissociation of a higher inorganic chloride which in turn is simultaneously formed from the corresponding lower chloride and molecular chlorine gas. The reaction is carried out entirely in the gaseous phase by maintaining an atmosphere of the lower chloride into which are separately introduced chlorine and the hydrocarbon in the desired combining proportions, and at approximately the rate at which combination occurs. The concentration of chlorine in the reaction zone is to be controlled so that it does not materially exceed at any time one molecular equivalent as compared with the total quantity of inorganic chloride present. Under such conditions the reaction is found to proceed readily and smoothly at temperatures materially below those at which chlorine and the hydrocarbons alone will react. It can be kept wholly under control at all times, and a substantially complete conversion of chlorine into desired chlorinated products is obtained without loss due to the formation of decomposition products.

A further advantage of conducting the reaction in an atmosphere of the vapors of the inorganic chloride is that the latter serve as a vapor phase solvent, or diluent, for the reacting gases. In strongly exothermic reactions of the character in hand the rapid or sudden liberation of large quantities of heat often raises the temperature of the mixture to an excessive degree, leading to the formation of decomposition products, at times accompanied by explosions which are destructive to apparatus, endangering the safety of operators as well as causing a loss of desired reaction products. The presence of the vapors of the inorganic chloride provides an effective medium for the absorption of heat and hence for modifying the force of the reaction, thereby affording a simple and easy means of controlling and maintaining the temperature within the prescribed limits.

The reaction products removed from the reaction zone are accompanied by vapors of inorganic chloride as well as the unreacted excess of hydrocarbon employed. This mixture will be preferably passed first through a reflux condenser for the separation of inorganic chloride, which is returned to the process, and then to a condensing system wherein the liquefied products are separated from the uncondensed gases or vapors, and the latter returned to the reaction.

The choice of a suitable inorganic chloride is determined by the temperature at which the reaction is to be carried out. In the case of methane, or of a natural gas, such temperature lies approximately between 200° and 300° C. Within this range antimony trichloride best serves our purpose, while in reactions occurring at materially lower temperatures iodine monochloride may be preferred. When the optimum temperature of reaction is somewhat above the boiling point of the inorganic chloride, e. g., 223° for antimony trichloride, the vapors thereof will be rapidly removed from the reaction zone, which will become depleted with respect thereto. In such case, accordingly, it is best to place the system under pressure such that the boiling point of the inorganic chloride is raised to approximately the same temperature as that of the reaction, thus insuring and maintaining at all times a high concentration of vapors within the reaction zone. Conversely, when the reaction is carried out at a temperature lower than the boiling point of the inorganic chloride used, the system is best maintained under reduced pressure such that condensation of vapors of inorganic chloride within the reaction zone is avoided.

Referring to the drawing, the chlorination of methane is carried out in a tube or tower 1, filled with a suitable porous packing, such as pumice, and surrounded by a furnace 2. Antimony trichloride is boiled in a flask or still 3, heated by gas burner 4 or other means and the vapors pass through the connecting tube 15 into reaction tower 1. Methane is introduced through inlet tube 13 near the base of tower 1, and chlorine through inlet tube 14 leading into the upper part of still 3. The vaporized reaction mixture leaves the tower 1 through branched pipe 5, one arm of which is a reflux condenser 6, surrounded by a water jacket, and the other arm forming a vapor tube 7 to which is connected a trapped return pipe 10 leading to the vapor space in still 3. A portion of the vapors issuing from the reaction tower passes to the reflux condenser 6, where antimony trichloride is condensed and returned directly to the tower. The non-condensed residual gases pass out through outlet pipe 8, regulated by valve 9, and thence to a condenser system (not shown) for collecting and separating the reaction products. The remaining portion of the vapors from the reaction passes to vapor tube 7, and thence to return tube or by-pass 10 through which the heavy vapors of antimony trichloride are returned to still 3, while the lighter gases or vapors are vented through a water jacketed branch pipe 11. In the latter pipe any antimony trichloride contained in the light gases is condensed out and returned to pipe 10, and the uncondensed gases pass through the valve-controlled outlet 12 communicating with outlet pipe 8 and thence to the condenser system previously referred to. The relative amount of reaction gases passing through the reflux condenser and return tube respectively can be regulated at will by adjusting valves 9 and 12. This has been found in practice a convenient method for maintaining a maximum concentration of antimony trichloride vapor throughout the reaction zone while insuring at all times a sufficient reserve supply to maintain the liquid level in the still.

To illustrate the operation of the apparatus just described the following example is given, but it will be understood that the example is not to be considered as a limitation upon the practice of our improved process. The relative amounts of chlorine and hydrocarbon introduced may be varied at will, as well as other factors such as temperature, pressure, et cetera, depending upon the hydrocarbon employed and the particular chlorinated product or products desired.

The still 3 was charged with antimony trichloride and the contents heated to boiling, approximately 223° C. The reaction tower was heated to a temperature of 265° C. and maintained at approximately that temperature, while a continuous supply of antimony trichloride in large excess was kept refluxing through the system. The whole apparatus was also maintained under a slight pressure, approximately 5 to 6 centimeters of mercury. Then a quantity of 1,875 moles of methane and 0.610 moles of chlorine was admitted through tubes 13 and 14 respectively. The reaction proceeded smoothly, and the product obtained consisted of 0.061 moles methyl chloride ($CH_3Cl$), 0.032 moles metylene chloride ($CH_2Cl_2$) and 0.034 moles chloroform ($CHCl_3$). No carbon tetrachloride was produced. The corresponding amount of hydrochloric acid obtained was 0.381 moles. The actual conversion of chlorine was 99 per cent, based upon the following equations:

$$CH_4 + Cl_2 = CH_3Cl + HCl$$
$$CH_4 + 2Cl_2 = CH_2Cl_2 + 2HCl$$
$$CH_4 + 3Cl_2 = CHCl_3 + 3HCl$$

In the example just cited the product consisted of nearly 50 per cent by volume of methyl chloride. If it is desired to increase the proportionate yield of methylene chloride or chloroform, the ratio of chlorine to methane in the gases admitted to reaction will be increased, and furthermore whatever methyl chloride is produced, after being separated from the higher chlorinated products, may be recycled through the system. Obviously also the unreacted methane in the exit gases from the chlorination is readily separated from the chlorinated products by the usual means, and may be continuously returned to the process. Any excess of chlorine in the exit gases will immediately combine with antimony trichloride in the reflux condenser, forming antimony pentachloride, which is condensed and flows back into the reaction zone together with the excess of trichloride, where at the reaction temperature it is at once dissociated into the trichloride and activated chlorine.

Our improved process is readily adapted to continuous operation, whereby chlorine and methane are continuously introduced in the proper proportions, while antimony trichloride is continuously vaporized and refluxed, maintaining at all times a saturated atmosphere thereof in the reaction chamber. The reaction products are condensed and separated from the exit gases, and the excess of methane and, if desired, lower chlorinated compounds continuously returned to the process. The process may be conducted at atmospheric pressure, or at reduced or increased pressure, whichever is found most convenient in actual operation with the particular hydrocarbon gas that is to be chlorinated. When operated under increased pressure, and consequently with a correspondingly greater density of atmosphere of antimony trichloride in the reaction zone, the thermal absorptive capacity of the system is increased to a material degree. This is of advantage especially in the chlorination of methane wherein a greater heat of reaction is developed than in the case of higher gaseous members of the aliphatic series.

The herein described process is to be clearly distinguished from other processes employing catalysts, which catalysts are commonly used in relatively small amount as compared with the quantity of reacting substances present in the reaction zone. The present process is dependent upon maintaining at all times an atmosphere of antimony trichloride throughout the reaction zone, and, as has been previously pointed out, the quantity of chlorine present at any instant preferably shall not exceed about one molecular proportion to the antimony trichloride. Usually it will be found most convenient to work with a lower concentration of chlorine than the above, in other words, an excess of antimony trichloride over and above a single molecular proportion thereof will be present in the reaction zone. Although the use of catalysts per se is not claimed in connection with our process, it is not excluded. Under certain conditions it may be found advantageous to deposit a catalytic material upon the pumice or other material used for tower packing, in addition to maintaining an atmosphere of antimony trichloride for the reaction.

Other modes of applying the principle of our invention may be employed instead of those explained, change being made as regards the process herein disclosed, provided the means stated by any of the following claims or the equivalent of such stated means be employed.

We therefore particularly point out and distinctly claim as our invention:—

1. In a process of chlorinating aliphatic hydrocarbons, the step which consists in conducting the reaction in an atmosphere of the lower chloride of an inorganic element capable of forming a higher chloride.

2. In a process of chlorinating aliphatic hydrocarbons, the step which consists in conducting the reaction in an atmosphere of antimony trichloride.

3. In a process of chlorinating aliphatic hydrocarbons, the step which consists in conducting the reaction in an atmosphere of the lower chloride of an inorganic element capable of forming a higher chloride and at a pressure such that the boiling point of the lower chloride is regulated approximately at the temperature of reaction.

4. In a process of chlorinating aliphatic hydrocarbons, the step which consists in conducting the reaction in an atmosphere of antimony trichloride and at a pressure such that the boiling point of said antimony trichloride is regulated approximately at the temperature of reaction.

5. In a process of chlorinating aliphatic hydrocarbons, the step which consists in introducing the hydrocarbon and chlorine into a reaction chamber wherein is maintained an atmosphere of the lower chloride of an inorganic element capable of forming a higher chloride, the concentration of such chloride being continuously maintained in excess of one molecular equivalent of the total quantity of chlorine present within the reaction zone.

6. In a process of chlorinating aliphatic hydrocarbons, the step which consists in introducing the hydrocarbon and chlorine into a reaction chamber wherein is maintained an atmosphere of antimony trichloride, the concentration of such chloride being continuously maintained in excess of one molecular equivalent of the total quantity of chlorine present within the reaction zone.

7. In a process of chlorinating aliphatic hydrocarbons, the step which consists in introducing the hydrocarbon and chlorine into a reaction chamber wherein is maintained an atmosphere of antimony trichloride, the concentration of such chloride being continuously maintained in excess of one molecular equivalent of the total quantity of chlorine present within the reaction zone while conducting the reaction at a pressure such that the boiling point of the antimony trichloride is regulated approximately at the temperature of reaction.

8. In a process of chlorinating aliphatic hydrocarbons, the steps which consist in introducing the hydrocarbon and chlorine into a reaction chamber wherein is maintained an atmosphere of the lower chloride of an inorganic element capable of forming a higher chloride, the concentration of such chloride being continuously maintained in excess of one molecular equivalent of the total quantity of chlorine present within the reaction zone, condensing and separating said chloride from the exit gases from the reaction, again vaporizing the so separated chloride and returning the vapors thereof to the first step.

9. In a process of chlorinating aliphatic hydrocarbons, the steps which consist in introducing the hydrocarbon and chlorine into a reaction chamber wherein is maintained an atmosphere of antimony trichloride, the concentration of such chloride being continuously maintained in excess of one molecular equivalent of the total quantity of chlorine present within the reaction zone, condensing and separating said chloride from the exit gases from the reaction, again vaporizing the so separated chloride and returning the vapors thereof to the first step.

10. In a process of chlorinating aliphatic hydrocarbons, the steps which consist in introducing the hydrocarbon and chlorine into a reaction chamber wherein is maintained an atmosphere of antimony trichloride, the concentration of such chloride being continuously maintained in excess of one molecular equivalent of the total quantity of chlorine present within the reaction zone, while conducting the reaction at a pressure such that the boiling point of the antimony trichloride is regulated approximately at the temperature of reaction, condensing and separating said chloride from the exit gases from the reaction, again vaporizing the so separated chloride and returning the vapors thereof to the first step.

11. The process of chlorinating methane which includes the step of conducting the reaction in an atmosphere of antimony trichloride.

12. The process of chlorinating methane which includes the step of conducting the reaction in an atmosphere of antimony trichloride and at a pressure such that the boiling point of said chloride is regulated approximately at the temperature of reaction.

13. The process of chlorinating methane which includes the steps of introducing the same and chlorine into an atmosphere of antimony trichloride vapors, continuously maintaining the concentration of such chloride in excess of one molecular equivalent of the total quantity of chlorine present within the reaction zone, and subjecting the reacting mixture to super-atmospheric pressure.

14. The process of chlorinating methane which includes the steps of introducing the same and chlorine into an atmosphere of antimony trichloride vapors, continuously maintaining the concentration of such chloride in excess of one molecular equivalent of the total quantity of chlorine present within the reaction zone, condensing and separating said chloride from the exit gases, again vaporizing the so separated chloride and returning the vapors thereof to the reaction chamber.

15. The process of chlorinating methane which includes the steps of introducing the same and chlorine into an atmosphere of antimony trichloride vapors at a temperature between 200° and 300° C., continuously maintaining the concentration of such chloride in excess of one molecular equivalent of the total quantity of chlorine present within the reaction zone, condensing and separating said chloride from the exit gases, again vaporizing the so separated chloride and returning the vapors thereof to the reaction chamber.

16. The process of chlorinating aliphatic hydrocarbons which comprises introducing the hydrocarbon and chlorine into a reaction chamber, wherein is maintained an atmosphere of the vapors of the lower chloride of an element capable of forming a higher chloride, at a pressure whereat the boiling point of such chloride approximately corresponds to the temperature of the reaction.

Signed this 24th day of August, 1928.

LAWRENCE F. MARTIN.
ALBERT R. LUX.

which includes the steps of introducing the same and chlorine into an atmosphere of antimony trichloride vapors, continuously maintaining the concentration of such chloride in excess of one molecular equivalent of the total quantity of chlorine present within the reaction zone, and subjecting the reacting mixture to super-atmospheric pressure.

14. The process of chlorinating methane which includes the steps of introducing the same and chlorine into an atmosphere of antimony trichloride vapors, continuously maintaining the concentration of such chloride in excess of one molecular equivalent of the total quantity of chlorine present within the reaction zone, condensing and separating said chloride from the exit gases, again vaporizing the so separated chloride and returning the vapors thereof to the reaction chamber.

15. The process of chlorinating methane which includes the steps of introducing the same and chlorine into an atmosphere of antimony trichloride vapors at a temperature between 200° and 300° C., continuously maintaining the concentration of such chloride in excess of one molecular equivalent of the total quantity of chlorine present within the reaction zone, condensing and separating said chloride from the exit gases, again vaporizing the so separated chloride and returning the vapors thereof to the reaction chamber.

16. The process of chlorinating aliphatic hydrocarbons which comprises introducing the hydrocarbon and chlorine into a reaction chamber, wherein is maintained an atmosphere of the vapors of the lower chloride of an element capable of forming a higher chloride, at a pressure whereat the boiling point of such chloride approximately corresponds to the temperature of the reaction.

Signed this 24th day of August, 1928.
LAWRENCE F. MARTIN.
ALBERT R. LUX.

CERTIFICATE OF CORRECTION.

Patent No. 1,801,873.              Granted April 21, 1931, to

LAWRENCE F. MARTIN ET AL.

It is hereby certified that error appears in the printed specification of the above numbered patent requiring correction as follows: Page 3, line 47, for the quantity "1,875" read 1.875; same page, line 56, for the quantity "0,381" read 0.381; and that the said Letters Patent should be read with these corrections therein that the same may conform to the record of the case in the Patent Office.

Signed and sealed this 7th day of July, A. D. 1931.

(Seal)

M. J. Moore,
Acting Commissioner of Patents.

CERTIFICATE OF CORRECTION.

Patent No. 1,801,873.  Granted April 21, 1931, to

LAWRENCE F. MARTIN ET AL.

It is hereby certified that error appears in the printed specification of the above numbered patent requiring correction as follows: Page 3, line 47, for the quantity "1,875" read 1.875; same page, line 56, for the quantity "0,381" read 0.381; and that the said Letters Patent should be read with these corrections therein that the same may conform to the record of the case in the Patent Office.

Signed and sealed this 7th day of July, A. D. 1931.

(Seal)

M. J. Moore,
Acting Commissioner of Patents.